United States Patent [19]

Nishihara

[11] Patent Number: 5,742,600
[45] Date of Patent: Apr. 21, 1998

[54] MULTIPLEX ATM/STM CONVERTER FOR STRUCTURED DATA

[75] Inventor: Motoo Nishihara, Tokyo, Japan

[73] Assignee: NEC Corporation, Tokyo, Japan

[21] Appl. No.: 655,216

[22] Filed: Jun. 5, 1996

[30] Foreign Application Priority Data

Jun. 5, 1995 [JP] Japan ..................... 7-138173

[51] Int. Cl.⁶ ......................................... H04L 12/56
[52] U.S. Cl. ........................... 370/395; 370/409; 370/517
[58] Field of Search ..................................... 370/517, 382, 370/389, 392, 395, 412, 396, 397, 399, 378, 379, 374, 363, 516, 409, 474; 375/371, 372

[56] References Cited

U.S. PATENT DOCUMENTS

| | | | |
|---|---|---|---|
| 4,603,416 | 7/1986 | Servel et al. | 370/422 |
| 4,910,731 | 3/1990 | Sakurai et al. | 370/413 |
| 5,124,977 | 6/1992 | Kozaki et al. | 370/392 |
| 5,128,939 | 7/1992 | Takatori et al. | 370/509 |
| 5,280,475 | 1/1994 | Yanagi et al. | 370/399 |
| 5,577,037 | 11/1996 | Takatori et al. | 370/411 |

FOREIGN PATENT DOCUMENTS

| | | |
|---|---|---|
| 4-282936 | 10/1992 | Japan . |
| 5-22403 | 1/1993 | Japan . |
| 5-22404 | 1/1993 | Japan . |
| 5-37548 | 2/1993 | Japan . |

OTHER PUBLICATIONS

ITU Telecommunication Recommendation I 363, 1991.

*Primary Examiner*—Chau Nguyen
*Attorney, Agent, or Firm*—Foley & Lardner

[57] ABSTRACT

The disclosed device allows de-ceiling of ATM cells in structured data transmission according to ITU-Telecommunication Recommendation I. 363, reproduction of a plurality of STM frames represented at a speed of 64 kbps×n (n=any natural number), and moreover, discloses an architecture that allows a minimum of the buffer amount due to the de-ceiling. The ATM/STM converter according to the present invention includes an AAL1 processor 101, a common buffer section 102 that stores ATM cell payloads using link-list queues and in which a pointer within that link list is also stored, a write controller 103 that manages write addresses to the common buffer section, a read controller 105 that manages read addresses to the common buffer section, an empty cell address FIFO section 104 that manages a list of empty cell addresses within the common buffer section, a buffer initialization controller 107 that initializes the common buffer section, a frame position detector 108 that monitors the frame position of STM signals, and a CM section 106 that relates channel arrangement on the STM side with VP on the ATM side.

7 Claims, 5 Drawing Sheets

MULTIPLEX ATM/STM CONVERTER FOR STRUCTURED DATA

BACKGROUND OF THE INVENTION

1. Field of the Invention

The present invention relates to a multiplex ATM/STM converter for structured data that converts back to the original STM signals the asynchronous transfer mode (ATM) cells for transmitting in cell units information for each channel of synchronous transfer mode (STM) signals having a plurality of channels time-division multiplexed into frame cycles.

2. Description of the Related Art

STM signals having a fixed frame cycle (for example, 125 µsec or 500 µsec) are transmitted in an ATM network as ATM cells by an ATM adaptation layer (AAL1) protocol according to International Telecommunication Union (ITU) —Telecommunication Recommendation I. 363. The subject STM signals are represented by 64 kps×n (n being any natural number). The plurality of STM channels are each assigned a different virtual path (VP) and transmitted as ATM cells. In structured data multiplex ATM/STM conversion methods of the prior art, these ATM cells exceeding a value of cell delay variation (CDV) occurring within the ATM network are stored to a buffer divided in VP units, following which they are read out in accordance with frame conditions of the STM network. The buffer is initialized at times of overflow and underflow, and the storing and read-out of ATM cells exceeding the value of CDV occurring within that ATM network is resumed. In prior-art methods, the buffer is either divided into portions fixed in accordance with the speed of STM signals, or an efficient partitioning operation is contrived that takes advantage of regularities existing between a plurality of STM signals.

FIG. 1 is a block diagram showing the key portions of this type of ATM/STM conversion circuit. The ATM/STM conversion circuit is provided with AAL 1 (ATM adaptation layer type 1) processor 71, cell buffer 72, write controller 73, read controller 75, CM (control memory) section 76, and buffer initializer 77. AAL 1 processor 71 receives ATM cells S101 which are STM frames converted to cells according to the structured data transmission protocol of ITU-Telecommunication Recommendation I. 363. Upon receiving ATM cell S101, AAL 1 processor 71 executes segmentation and reassembly sublayer/convergence sublayer (SAR/CS) layer processing, and, as one result of this processing, extracts VP identifier (VPI) and the frame positions of STM frames. AAL 1 processor 71 sends this ATM cell S101 to cell buffer 72 and notifies write controller 73 of the arrival and VPI of that ATM cell. Cell buffer 72 is composed of a plurality of banks each having a memory capacity that is fixed or devised for operation at a certain degree of margine, and stores ATM cells by ATM cell VP, i.e., designating one bank per VP. Write controller 73 manages writing of ATM cells to the cell buffers. In other words, in response to the notification of the arrival of ATM cells, write controller 73 both controls the write address of cell buffer 72 and holds VP addresses for which read-out has been completed as empty addresses for subsequent writing. CM section 76 stores identifier information for VPs to be read out according to frames on the STM network side, and this information is notified to both read controller 75 according to STM network timing and to buffer initializer 77 to indicate that such notification has been generated. Read controller 75 manages read-out of VP from cell buffer 72. In other words, except during initialization, VPs are read out in response to the output of CM section 76 and time-division multiplexed STM frames are generated. At the time of initialization, read controller 75 also halts read-out of cell buffer 72 from the time following resetting of cell buffer 72 until the time at which the CDV value is exceeded. At times of overflow or underflow of a bank of the cell buffer, buffer initializer 77 directs write controller 73 to halt writing to that bank and resets that bank to 0. Buffer initializer 77 further inputs signals that notify of generation of write or read-out from the write controller 73 and read controller 75, respectively, and monitors the amount of information stored in cell buffer 72; and in addition, sets a threshold value corresponding to the CDV value based on output from CM section 76, and when the amount of data stored in that bank reaches the threshold value, directs the read controller 75 to end initialization and resume read-out. In this way, read-out is resumed after storage to cell buffer 72 of an amount of data corresponding to a CDV value.

When accommodating a plurality of STM signals having completely different speeds in the prior-art system described hereinabove, the magnitude of memory provided for the overall cell buffer becomes exceedingly large because the size of a cell buffer corresponding to each individual VP is made to correspond to the STM signal of maximum speed. Methods have been considered by which a certain degree of restraint is placed on the speed conditions and frame format of the plurality of STM signals, and moreover, the regularity between the speeds of STM signals under these conditions can be used to suppress to a minimum the amount of memory of all cell buffers, but it has not been possible to accommodate a plurality of STM signals having completely different and arbitrary speeds at a low memory cost. All methods have encountered the problem of resultant increases in circuit scale and power consumption.

SUMMARY OF THE INVENTION

The object of the present invention is to realize an architecture that fixes at a constant the amount of all cell buffers and enables automatic reading to the STM side for a plurality of STM signals having a combination of completely arbitrary speeds, thereby keeping the cell buffer capacity itself at a minimum under all conditions logically and further suppressing circuit scale and power consumption to a minimum.

In order to solve the above-described problem, the structured-data multiplex ATM/STM converter of the present invention is an ATM/STM conversion circuit that converts to original STM signals the ATM cells for transmitting information in cell units for each channel of STM signals having a plurality of channels time-division multiplexed into frame cycles; and includes:

- an AAL1 processor 101 that inputs the ATM cells, subjects these ATM cells to SAR/CS layer processing according to the structured data transmission protocol of ITU-Telecommunication Recommendation I. 363, and as one result of this processing, extracts virtual path identifiers and frame positions on STM frames and outputs the ATM cells;
- cell buffer means that stores the ATM cells by each virtual path to absorb cell delay variation of the ATM cells;
- a write controller within the cell buffer means which, when establishing regions as cell blocks for storing each virtual path, controls cell block addresses for writing to the cell buffer means ATM cells having virtual path numbers extracted by AAL1 processor;
- a control memory section in which is stored the channel arrangement of virtual paths of ATM cells to STM frames, and which from which is read, in accordance with frame conditions of the STM network, information designating a virtual path to be read next from the cell buffer means;

a read controller that manages read-out addresses to the cell buffer means and reads from the cell buffer means virtual paths designated by the output of the control memory section; and a buffer initialization controller that inputs signals that notify of generation of writing and read-out from the write controller and read controller, respectively, and monitors the amount of information stored in the cell buffer means, and which executes buffer initialization processing when the amount of information satisfies prescribed conditions.

The cell buffer means includes a plurality of queues for storing payloads of ATM cells received from the AAL1 processor for each virtual path, and moreover, is structured as a common buffer in which the buffer amounts of cell blocks making up each queue are mutually and independently set such that the sum total of the buffer amounts of all queues equals a prescribed value determined depending on the transmission path capacity.

If the virtual path identifier of the virtual path stored in that queue is k, the frame length of virtual path k is $F_k$, and the ratio of the cell delay variation T to frame cycle $T_f$ ($T/T_f$) is n, the buffer amount of each of the queues is set to equal $2nF_k$. In addition, when the cell delay variation of the ATM network is T, the sum total of buffer amounts is set to equal 2T times the transmission path capacity. The plurality of queues preferably make up a link list.

If the channel speed of a channel corresponding to the VP of identifier k is $R_k$ and the value of CDV within the network is T, it can be seen that $2 \times R_k \times T$ is the minimum cell buffer amount of each channel (each VP) necessary for absorbing CDV such that STM frames outputted from the ATM network to the STM network match the original STM frames. Accordingly, $$\text{total cell buffer amount} = \Sigma(2 \times R_k \times T) \quad (1)$$
$$= 2T\Sigma R_k$$
$$= 2T\Sigma_{all}$$

where $\Sigma$ is the sum from k=1 to k=N, and N is the number of channels (the number of VP). The value of the maximum of total channel speed is determined from transmission path capacity regardless of the number of channels or the channel speed of each channel and is therefore fixed, and the value of CDV within the network is also fixed. Formula (1) can thus be realized for any combination of channel number and channel speed and indicates the minimum necessary cell buffer amount. The de-ceiling method of the present invention employs a common-buffer-type as the cell buffer, thereby enabling accommodation of any channel number and channel speed using cell buffer amounts indicated by formula (1).

In addition, the above-described cell buffer amount can be represented by:

$$2 \times R_k \times T = 2 \times (R_k T_f) \times (T/T_f) \quad (2)$$
$$= 2nF_k$$

The queue address of each channel within the cell buffer is pointed out by the same address as the cell block address of the cell buffer rather than by address management FIFO for every channel, and is managed by a pointer buffer which is a common buffer that executes the same operation as an address management FIFO for every channel, thereby allowing a reduction in the total memory amount. When using the address management FIFO for every channel, the size per channel is indicated by:

$$C = N \times \log_2 N \quad (3)$$

where C is the memory amount of address management FIFO per channel, and N is the number of cell blocks within the cell buffer section. As a result, the total amount of memory is given by the following formula (4):

$$C_{all} = C \times L = L \times N \times \log_2 N \quad (4)$$

where $C_{all}$ is the amount of memory of the address management FIFO of all channels, and L is the number of channels.

When using a pointer buffer, the amount of memory is given by the following formula (5):

$$C_{ptr} = N \times \log_2 N \quad (5)$$

where $C_{ptr}$ is the amount of memory of the pointer buffer, and N is the number of cell blocks within the cell buffer section.

The ratio of formula (5) and formula (4) is 1/L, and a large reduction of memory amount is achieved. This effect increases with increase in the total number of channels L.

The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENTS

Figure 1:
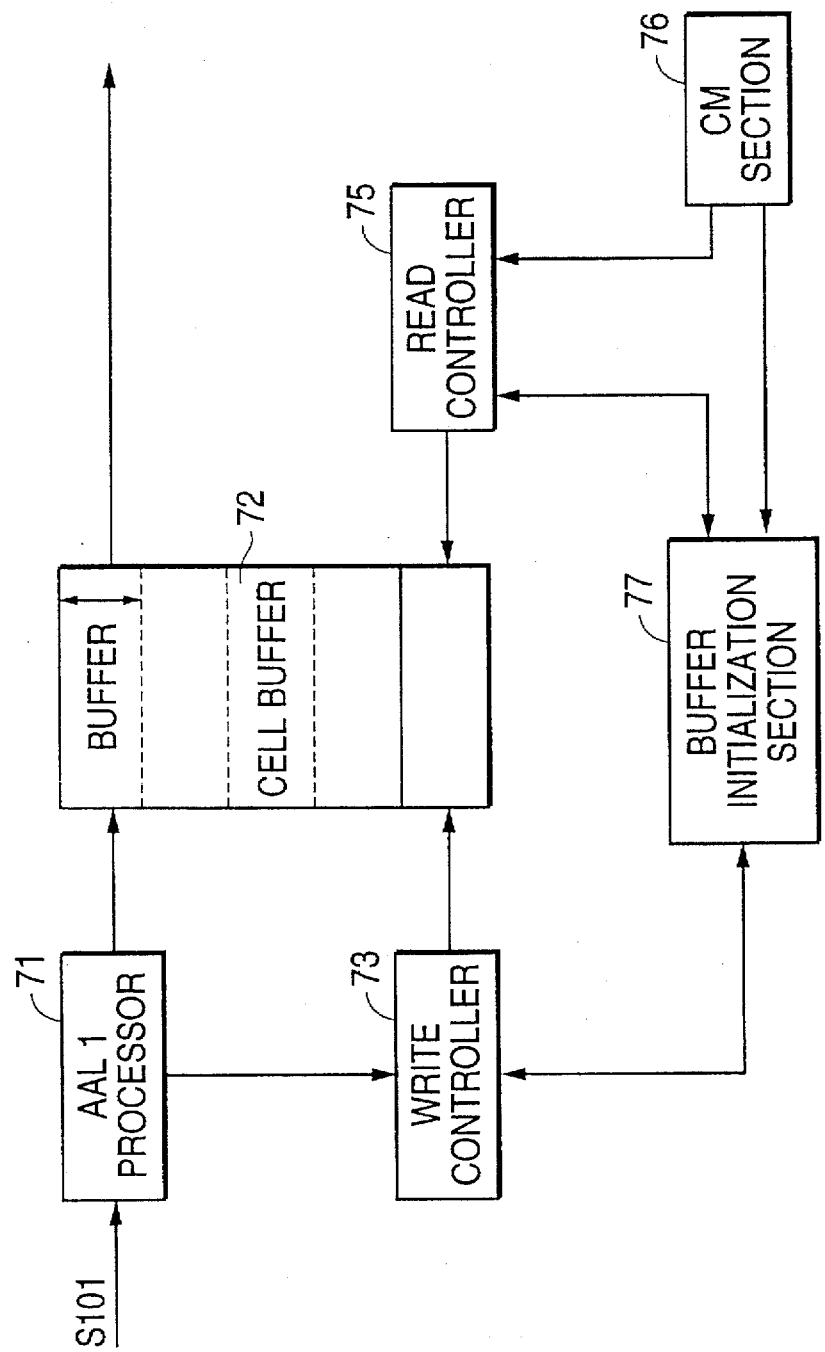
FIG. 1 is a block diagram of a prior-art multiplexed ATM/STM converter.
Figure 2:
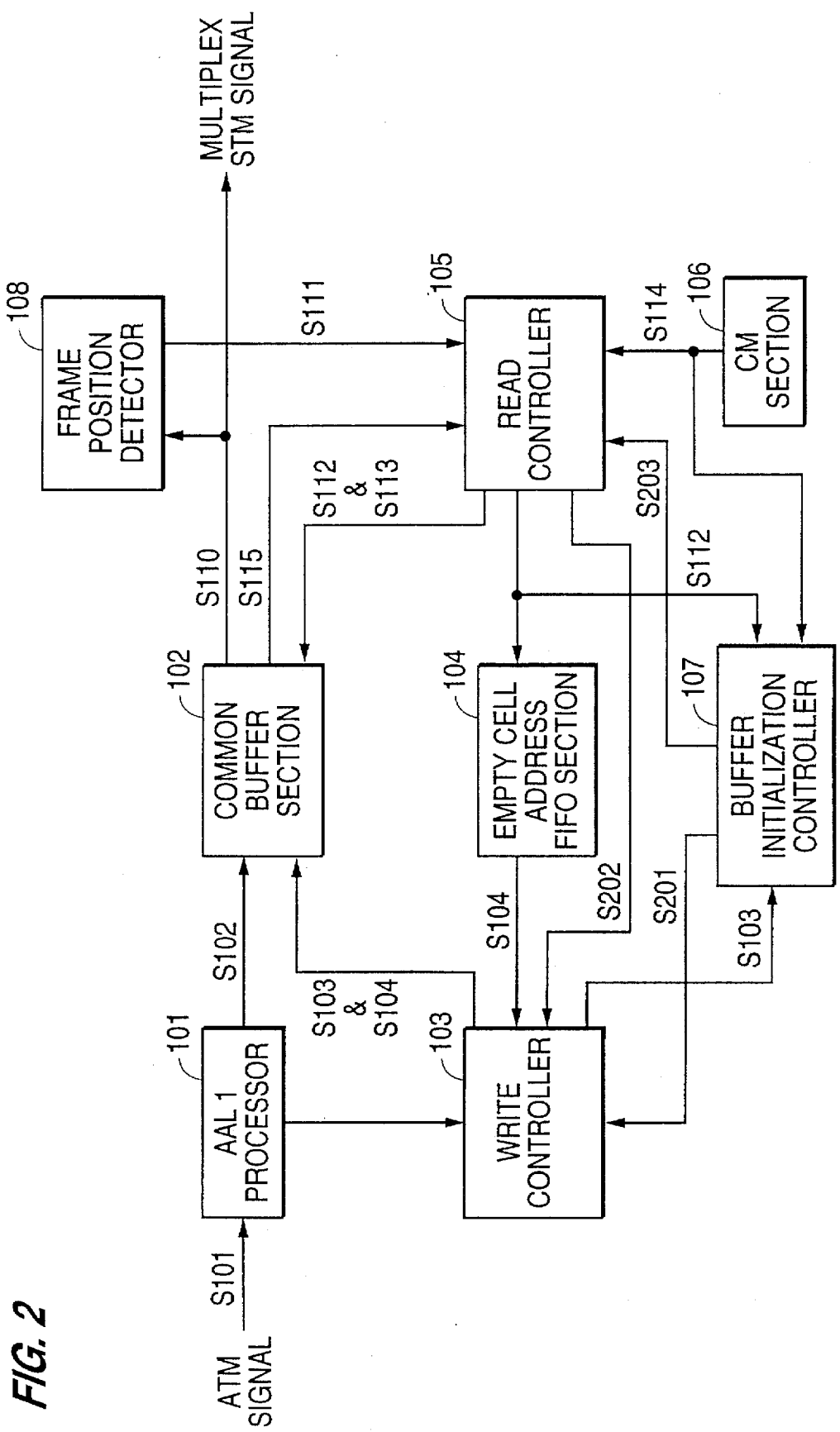
FIG. 2 is a block diagram showing an overall view of the architecture of the present invention.

Embodiments of the present invention are described hereunder with reference to the accompanying figures. A multiplexed ATM/STM conversion circuit according to the present invention is a circuit that converts ATM cells in which STM frames have been converted to cells through the structured data transmission protocol of ITU-Telecommunication Recommendation I. 363 to the original STM frames. FIG. 2 is a block diagram showing one embodiment of the multiplexed ATM/STM conversion circuit according to the present invention. A multiplexed ATM/STM conversion circuit according to this embodiment is provided with AAL1 processor 101, common buffer unit 102, write controller 103, empty cell address FIFO section 104, read controller 105, CM section. 106, buffer initialization controller 107, and frame position detector 108, and inputs ATM cell S101 to AAL1 processor 101.

Figure 6:
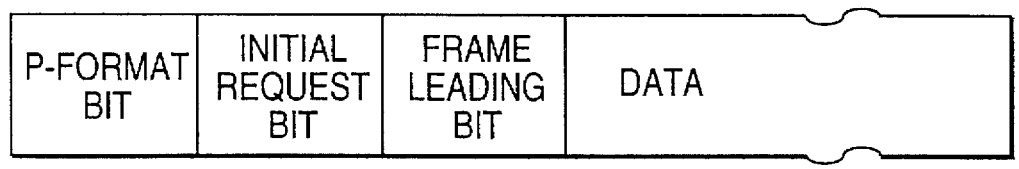
FIG. 6 shows the data format in the present invention.

Upon inputting ATM cell S101, AAL1 processor 101 executes SAR/CS layer processing, and as one result of this processing, extracts the frame positions of STM frames. AAL1 processor 101 also adds to the user data a frame position designation bit that indicates whether a frame or not, a buffer initialization request bit from buffer initialization controller 107, and a P-format bit that indicates whether ATM cells, which are data stored in a cell block, are P format or non-P format, and transmits the user data to common buffer section 102. FIG. 6 shows the data format of signal S102 that is inputted to common buffer section 102. AAL1 processor 101 also recognizes the VPI of inputted cells (virtual path identifier), and signals the VPI to the write controller 103.

Common buffer section 102 contains cell buffer section 202 as will be described hereinbelow, the cell buffer section 202 having queues in VP units (channel units on the STM network side), and each of the queue blocks store a payload of a respective ATM cell. These blocks will hereinafter be referred to as "cell blocks." Each address within the cell buffer section 202 is pointed by two types of addresses, a cell block address designating a cell block and a offset address which is the offset within each cell block. Common buffer section 102 receives ATM cells having the format of FIG. 6 from AAL1 processor 101, and these ATM cells are written to the common buffer section 102 in VP units to cell block addresses signaled from write controller 103. Common buffer section 102 also receives cell block address S104 from write controller 103 for the next inputted cells and holds S104 as data. Details regarding the construction and operation of common buffer section 102 will be described hereinbelow with reference to FIG. 3.

Upon receiving notification of the arrival of new cells and their VP numbers from AAL1 processor 101, write controller 103 selects the VP register value S103 from a tail register value recorded in VP units (Channel units on the STM network side) held within write controller 103 and forwards that register value as the cell block address of that VP to common buffer section 102. Further, in relation to that VP, write controller 103 receives the cell block address S104 of the next inputted ATM cell from empty cell block address FIFO section 104, and updates the value of the tail register of that VP within write controller 103. At the same time, write controller 103 also forwards this new cell block address written to the tail register to common buffer section 102, and notifies buffer initialization controller 107 that writing of ATM cells has occurred.

Frame position detector 108 monitors the ON/OFF of the frame position designation bit in data S110 read out from common buffer section 102 (FIG. 6), and when ON, signals the instructions to read controller 105 (S111). CM section 106, according to timing of the STM network side, signals the VP to be read out to read controller 105 and buffer initialization controller 107.

Based on frame position (S111) signaled from frame position detector 108, read controller 105 reads the VP designated by CM section 106 and synchronized with the timing of the STM network side. In addition, read controller 105 notifies the cell block address of a VP for which read-out is completed as an empty cell address to empty cell address FIFO section 104 and buffer initialization controller 107. A detailed description of the construction and operation of read controller 105 will be presented hereinbelow with reference to FIG. 3.

Buffer initialization processor 107 receives VP number S114 from CM section 106, information S103 indicating that writing has occurred for each VP unit from write controller 103, and also receives as S112 from read controller 105 information indicating that read-out has occurred for each VP unit, and calculates the queue length of each VP unit in the cell buffer section by a method to be explained hereinbelow. From the results of this calculation, buffer initialization controller 107 performs comparison on three points: (1) that the queue is empty (2) that the queue is 2n times the frame length (n being the CDV value within the network divided by 125 μsec), (3) that the queue is n times the frame length, converts the results to signals (S201, S203) for use by buffer initialization control, and signals write controller 103 and read controller 105. Details regarding the construction and operation of buffer initialization controller 107 will be described hereinbelow with reference to FIG. 4.

Empty cell address FIFO section 104 manages empty cell block addresses in common buffer section 102 within empty cell address FIFO section 104, signals empty cell block addresses S104 stored at the head of empty cell address FIFO 104 in response to requests from write controller 103, and when read controller 105 completes read-out of a VP, stores that cell block address S112 at the end of empty cell address FIFO as a newly empty cell block address.

Figure 3:
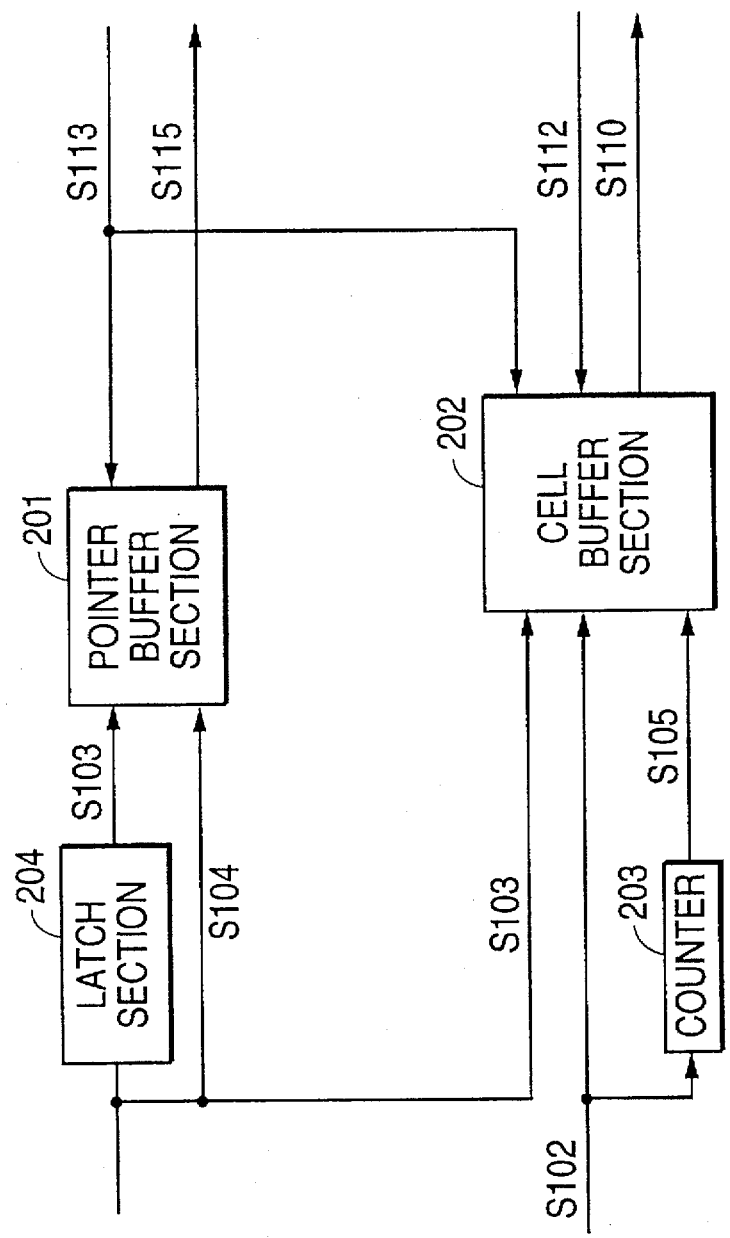
FIG. 3 is a block diagram showing the construction of a common memory section 102 shown in FIG. 2.

FIG. 3 is a block diagram showing the detailed construction of common buffer section 102 shown in FIG. 2. The common buffer section 102 is provided with cell buffer section 202, pointer buffer section 201, latch section 204, and counter 203. Cell buffer section 202 includes queues in VP units (channel units on the STM network side), and individual blocks of the queues store payloads of individual ATM cells and individual blocks of the queue are pointed out by two types of addresses: addresses in cell block units and offset addresses within individual cell blocks. Pointer buffer section 201 stores queue pointers (cell block addresses) of a link list structure in cell buffer section 202. Latch section 204 latches addresses (cell block addresses) in cell block units. Counter 203 carries out a count to 46 or a count to 47 depending on whether inputted ATM cells are P format or non-P format, respectively.

The common buffer section 102 of this embodiment functions as follows. Common buffer section 102 receives data having the format of FIG. 6 from AAL1 processor 101, and transmits cell block addresses and inputted cells to cell buffer section 202 to write to cell block addresses signaled from write controller 103. From the P-format bit of input data S102 shown in the format of FIG. 6, counter 203 receives notification of whether the inputted cells are P format or non-P format and counts up from 0 to 46 or 47, respectively. Cell buffer section 202 recognizes cell block address S103 signaled from write controller 103 and offset address S105 received from counter 203 as the stored address of an inputted cell, and writes the payload portion of the inputted cell to its internal memory. Latch section 204 latches the cell block address to which the inputted cell is written. Pointer buffer section 201 receives from write controller 103 cell block address S104 for the inputted cell following that VP, and writes S104 as data, in internal memory using the cell block address S103 latched by latch section 204 as the address in the internal memory.

Figure 7:
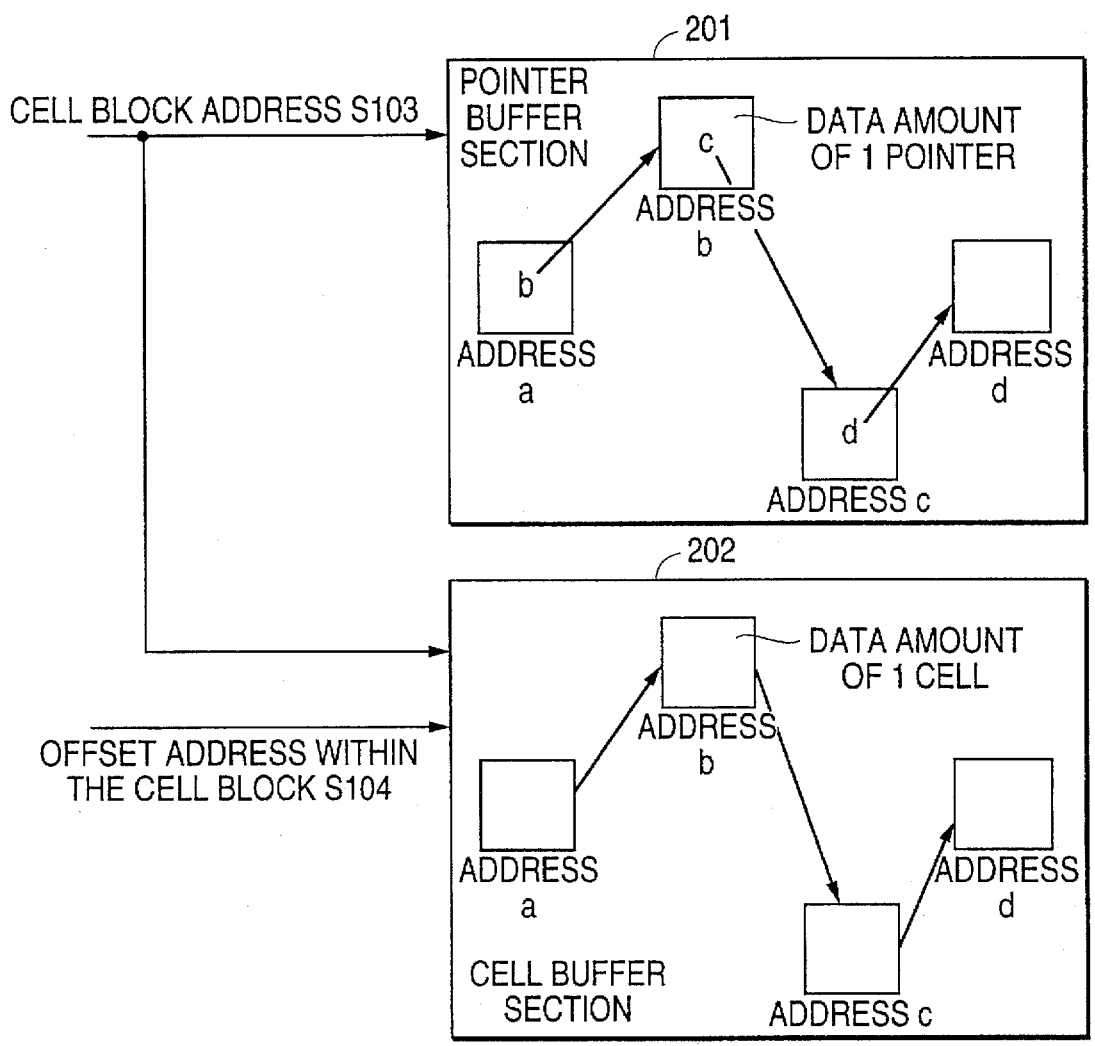
FIG. 7 shows the management construction of a link list in the common buffer section 102.

FIG. 7 shows the link list management structure of VP units in common buffer section 102. Here, a link list is shown by which the payload of an ATM cell and a pointer designating the position of storing the next ATM cell, respectively, are stored in the addresses of cell buffer section 202 and pointer buffer section 201 designated by the same cell block address signal S103. In this link list, the payload of a designated VP is stored at the position of,, for example, cell block address b of cell buffer section 202, and a pointer c indicating the storage position of the next ATM cell to be stored is stored as data at the position of the same address b of pointer buffer section 201.

Figure 4:
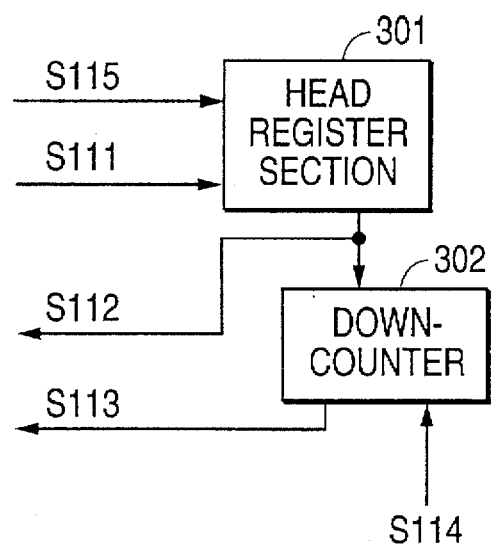
FIG. 4 is a block diagram showing the construction of the read controller 105 in the present invention.

FIG. 4 is a block diagram showing a detailed block diagram of read controller 105. Read controller 105 is provided with head register section 301 and down-counter 302. Head register section 301 holds for each VP the cell block address S112 of the head of the queue of VP units (channel units of STM) existing within cell buffer section 202. Head register section 301 also holds offset value S113 within a cell block being read from in VP unit (channel unit on the STM network side). Down-counter 302 counts down to 0 from 46 or from 47 depending on whether cell blocks being read from by STM network-side channel are P format or non-P format, respectively.

Read controller 105 receives from CM section 106 notification (S114) of the VP identifier to be outputted at the present time, adds 1 to offset value S113 of the cell block of this VP if the cell block of the VP is currently being read from, and obtains offset address S113 to be newly read. If the offset value of the cell block address being read of this VP is a maximum (46 bytes if the cell block is of P format and 47 bytes if of non-P format), read-out has been completed to this cell block, and consequently, the next cell block address S115 in the queue within cell buffer section 202 of this VP is received from pointer buffer section 201 and written to head register section 301. At the same time, according to the P-format bit of data (FIG. 6) read out from cell buffer section 202, read controller 105 determines whether the ATM cell within the newly read cell block is of P format or non-P format, and loads an offset value of 46 or 47, respectively, to down-counter 302.

Figure 5:
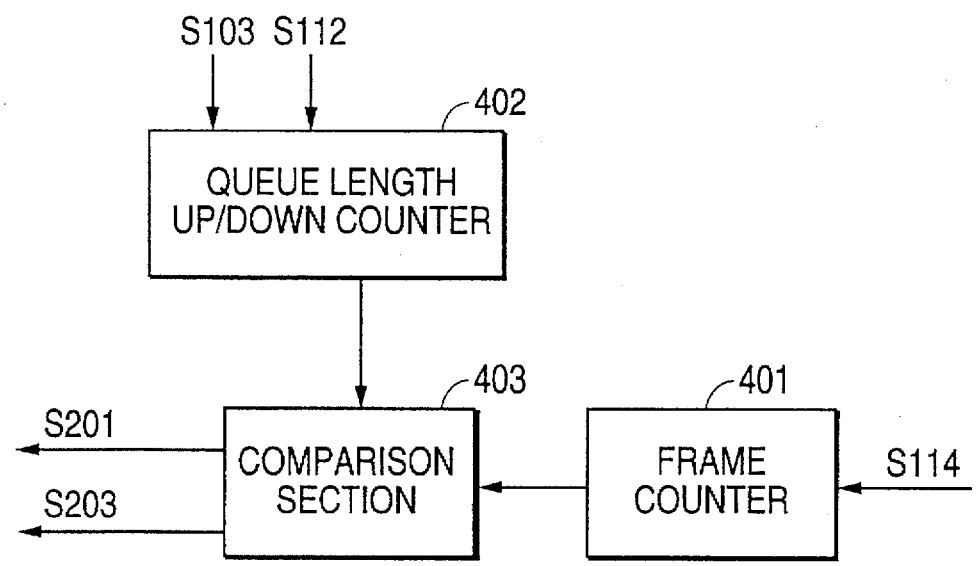
FIG. 5 is a block diagram showing the construction of the buffer initialization controller 107 in the present invention.

FIG. 5 is a block diagram showing a detailed block diagram of the buffer initialization controller 107. Buffer initialization controller 107 of this embodiment is equipped with frame counter 401, queue length up/down counter 402, and comparison section 403. Frame counter 401 monitors the output of CM section 106 by VP (by channel on the STM side) in 125 μsec intervals, calculates frame length, multiplies by network CDV value n, which is set according to system, to calculate buffer threshold value $Th_{1,k}$ by VP (identifier k) (by channel on the STM side), and further, doubles this value to calculate the buffer length $Th_{2,k}$ by VP (by channel on the STM side). Queue length up/down counter 402 receives a signal indicating for each VP the occurrence of write or read-out from write controller 103 and read controller 105, respectively, and calculates the queue length in cell block units by VP (by channel on the STM side) within cell buffer section 202. Comparison section 403 compares each type of output of frame counter 401 and queue length outputted by queue length up/down counter 402 and generates buffer initialization signals and buffer initialization process completion signals. The buffer initialization controller section 107 operates as follows. Frame counter 401 decodes VP identifier k (Signal S114) inputted from CM section 106, counts the number of occurrences of the VP identifier within a set frame cycle for each VP identifier, and measures frame length of each VP. Each VP has a one-to-one correspondence to each channel on the STM network side. The frame length of each of these VP is multiplied by CDV value (the CDV value within the ATM network divided by 125 μsec) n, which is measured in units of frame cycles, and a first threshold value $Th_{1,k}$ is generated by VP (identifier k). A second threshold value $Th_{2,k}$ is further generated by multiplying this frame length for each VP by 2n. $Th_{1,k}$ corresponds to the variation in average cell speed due to cell delay variation of the ATM network. $Th_{2,k}$ is the minimum buffer amount required to absorb cell delay variation and limits the buffer length of the queue that stores that VP. The queue length up/down counter 402 holds an up/down counter for each VP (for each channel on the STM network side), receives as signal S103 from write controller 103 the number of write occurrences in each VP, receives as signal S112 from read controller 105 the number of read occurrences for each VP, and measures queue length for each respective VP within cell buffer section 202. Based on $Th_{1,k}$ and $Th_{2,k}$ from frame counter 401 and queue length from queue length up/down counter 402, comparison section 403 performs comparison for each VP (identifier k) (for each channel for STM signals) on the three points: (1) queue is empty, (2) the queue is 2n times ($=Th_{2,k}$) the frame length, (3) the queue is n times ($=Th_{1,k}$) the frame length; converts the results to buffer initialization request signals (S201 and S203) for buffer initialization control use, and signals write controller 103 and read controller 105.

The overall operation of an ATM/STM conversion circuit having the above-described construction is as follows. First, the initialization process is executed for a queue when the queue length for each VP (for each channel of STM signals) in the cell buffer section 202 becomes 0, or when the queue length becomes $Th_{2,k}$. According to this initialization process, after the queue length is reset to zero, inputted ATM cells are accumulated for the frame length ($Th_{1,k}$) corresponding to the CDV n value within the network, following which the reading process to the STM network commences. To this end, buffer initialization controller 107 outputs buffer initialization request signal S201 to write controller 103. When writing to cell buffer section 202 of the next input cell in the VP of that queue, write controller 103 sets the buffer initialization request bit of that VP to ON and halts writing of input ATM cells to cell buffer section 202 following that VP. Read controller 105 continues reading from the queue of that VP, and upon detecting that the buffer initialization request bit in the read data is ON, signals write controller 103 that reading of the queue is completed and that the queue is empty (S202). After receiving this notification, write controller 103 resumes writing to cell buffer section 202 of input ATM cells of that VP. Buffer initialization controller 107 monitors the queue length of that VP (k), and sends a read resume command (S203) to read controller 105 when the queue length exceeds $Th_{1,k}$. Read controller 105 then resumes reading from the queue of that VP.

Frame position detector 108 notifies read controller 105 (S111) upon detecting ON at the frame position bit of data read from cell buffer section 202. CM section 106, when outputting CM information S114 designating the first time slot within an 8-kHz frame of each VP (each channel of STM signals), sets the leading time slot of that CM information to ON and outputs. When receiving frame position command signal S111 from frame position detector 108, read controller 105 halts reading from cell buffer section 202 to the STM-side channel when the leading time slot bit of CM information S114 from CM section 106 is not ON, and commences reading when the leading time slot bit of CM information turns ON. In this way, the phase of frames stored in cell buffer section 202 is synchronized with the phase of frames read to the STM network for each VP. As described in detail in the foregoing explanation, the present invention has the following effects:

(1) By using a common-memory-type buffer as a cell buffer, the VP of a plurality of structured (i.e., having frames) CBR (Continuous Bit Rate) signals of any combination of channel number and channel speed can be inputted and converted to STM signals.

(2) Frame phase, which is an integral multiple of the 8-kHz channel interval, can be easily matched to 8-kHz units on the STM side. Through the use of control memory, these processes can be automatically performed by external information alone.

(3) The cell buffer amount can be realized at a minimum memory cost logically.

(4) Cell buffer address management is simplified because the write side of the cell buffer is performed in cell block units.

(5) Because connections of each channel queue within the cell buffer are managed by a pointer buffer, which is a common buffer that operates identically to the cell buffer and points to the same address as the cell block addresses, construction can be realized without necessitating an address FIFO to manage queues within the cell buffer in units of each channel.

(6) Through the combination of the above points, a totally free ATM/STM conversion can be realized at a near minimum in hardware cost and power consumption. It is to be understood, however, that although the characteristics and advantages of the present invention have been set forth in the foregoing description, the disclosure is illustrative only, and changes may be made in the arrangement of the parts within the scope of the appended claims.

What is claimed is:

1. A multiplex ATM/STM converter for structured data which is an ATM/STM conversion circuit that converts back to original STM signals ATM cells by which information is transmitted in cell units for each channel of STM signals having a plurality of channels time-division multiplexed into frame cycles; and comprising:

an ATM adaptation layer 1 (AAL1) processor (101) that inputs said ATM cells, subjects these ATM cells to SAR/CS layer processing according to structured data transmission protocol of ITU-Telecommunication Recommendation I. 363, and as one result of this processing, extracts virtual path identifiers and frame positions of STM frames and outputs said ATM cells;

cell buffer means that stores said ATM cells by each virtual path to absorb cell delay variation (CDV) of said ATM cells;

a write controller within said cell buffer means which, when establishing regions as cell blocks for storing each virtual path, controls cell block addresses for writing to said cell buffer means ATM cells having virtual path numbers extracted by said AAL1 processor;

a control memory section in which is stored the channel arrangement of virtual paths of ATM cells to STM frames, and from which is read, in accordance with frame conditions of the STM network, information designating a virtual path to be read next from said cell buffer means;

a read controller that manages read-out addresses to said cell buffer means and reads from said cell buffer means virtual paths designated by output of said control memory section; and a buffer initialization controller that inputs signals that notify of generation of writing and readout from said write controller and read controller, respectively, and monitors the amount of information stored in said cell buffer means, and which executes buffer initialization processing when said amount of information satisfies prescribed conditions;

wherein said cell buffer means comprises a plurality of queues for storing payloads of ATM cells received from said AAL1 processor for each virtual path, and moreover, is structured as a common buffer in which buffer amounts of cell blocks making up each queue are mutually and independently set such that the sum total of buffer amounts of all queues equals a prescribed value determined depending on the transmission path capacity.

2. A device according to claim 1 wherein, if the virtual path identifier of the virtual path stored in that queue is k, the frame length of virtual path k is $F_k$, and the ratio of cell delay variation T to frame cycle $T_f$ ($T/T_f$) is n, the buffer amount of each of the queues is set to equal $2nF_k$.

3. A device according to claim 2 wherein, if cell delay variation of that ATM network is T, the sum total of buffer amounts is set to equal 2T times the transmission path capacity.

4. A device according to claim 1 wherein said plurality of queues make up a link list.

5. A device according to claim 4 wherein said common buffer comprises a cell buffer section, a pointer buffer section, a latch section, and a counter;

said cell buffer section comprises queues corresponding are each for each virtual path, and each individual cell block of a queue stores a payload of an individual ATM cell; the address of information stored in a cell block is designated by two types of addresses: a cell block address designating the cell block and an offset address designating stored position within each individual cell block; said pointer buffer section stores pointers of queues made up a link list structure within said cell buffer section, said pointers designating the cell block address of a next cell block of cell blocks constituting that queue; said latch section latches cell block addresses; said counter counts to 46 or 47 depending on whether input ATM cells are of P format or non-P format, respectively, and designates said offset address.

6. A device according to claim 1 wherein said read controller comprises a head register section and a down-counter, said head register section stores cell block address for reading corresponding virtual path, said down-counter generates offset addresses for reading and counts down to 0 from a value of 46 or 47 depending on whether each cell block read out by channel on the STM network side is of P format or non-P format.

7. A device according to claim 2 wherein said buffer initialization controller comprises a frame counter, queue length up/down counter, and comparison section; said frame counter monitors output of said control memory section in frame cycle intervals by virtual path (k) and calculates frame length ($F_k$); multiplies this frame length by ratio n to calculate first buffer threshold value $Th_{1,k}$ by virtual path, and further, doubles $Th_{1,k}$ to calculate second buffer threshold value $Th_{2,k}$ by virtual path; said queue length up/down counter inputs signals from write controller and read controller notifying of occurrence of write and read, respectively, and calculates queue length by virtual path within said cell buffer for each cell block; and said comparison section compares queue length outputted by said queue length up/down counter with the output of said frame counter, and said buffer initialization controller, for each respective virtual path (k), after resetting a queue when that queue length is 0 or $Th_{2,k}$, generates a buffer initialization signal that directs said write controller and said read controller to perform write while halting read-out of that queue until the queue length reaches $Th_{1,k}$, and generates a buffer initialization process completion signal to resume reading when queue length of that queue reaches $Th_{1,k}$.

* * * * *